United States Patent [19]

Popeil et al.

[11] 4,385,911

[45] May 31, 1983

[54] AIR FILTERING DEVICE

[75] Inventors: Ronald M. Popeil, Beverly Hills; Alan L. Backus, Los Angeles, both of Calif.

[73] Assignee: Ronco Teleproducts, Inc., Elk Grove Village, Ill.

[21] Appl. No.: 341,681

[22] Filed: Jan. 22, 1982

[51] Int. Cl.³ ............................................. B01D 50/00
[52] U.S. Cl. ......................................... 55/316; 55/323; 55/472; 55/504; 55/518; 55/529; 55/485
[58] Field of Search .......... 55/316, 467, 323, 470-473, 55/482, 485, 504, 518, 529

[56] References Cited

U.S. PATENT DOCUMENTS

| | | | |
|---|---|---|---|
| 2,825,500 | 3/1958 | McLean | 55/470 |
| 3,747,300 | 7/1973 | Knudsen | 55/485 |
| 3,861,894 | 1/1975 | Marsh | 55/467 |
| 3,936,284 | 2/1976 | Mason | 55/485 |
| 3,960,527 | 6/1976 | Goettl | 55/467 |
| 4,252,547 | 2/1981 | Johnson | 55/472 |

*Primary Examiner*—Bernard Nozick
*Attorney, Agent, or Firm*—Shlesinger, Arkwright, Garvey & Dinsmore

[57] ABSTRACT

A compact air filtering device for filtering room air in the home or work environment constructed of a minimum number of unitary structural elements is disclosed, the device having a fan for drawing air through the device encased in detachably interlocked upper and lower enclosure members, one filter positioned on the upper fan enclosure member, and a housing detachably interlocked with the lower fan enclosure member enclosing the filter and the upper fan enclosure member. The device is adapted to receive additional filters identical in construction to the first filter by the addition of an intermediate housing member which increases the internal space within the device without any modification to any of the elements of the device.

42 Claims, 23 Drawing Figures

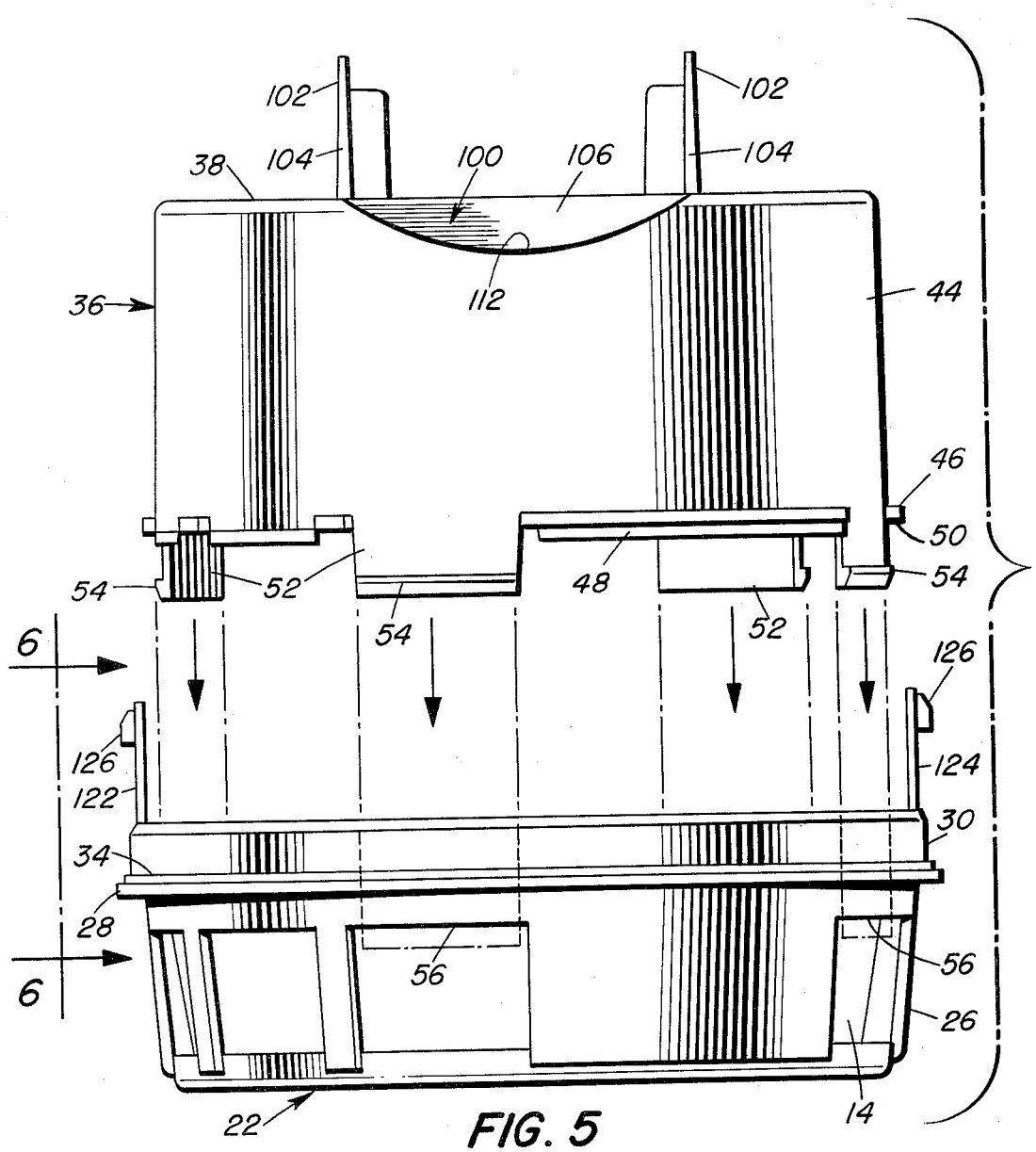
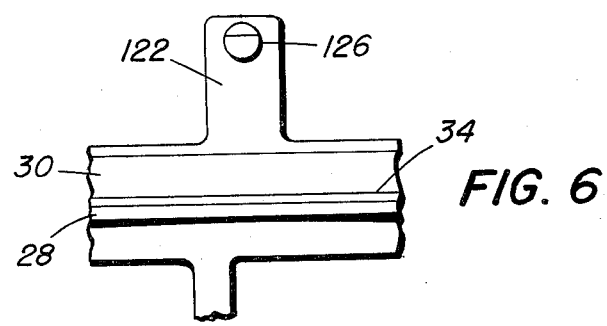

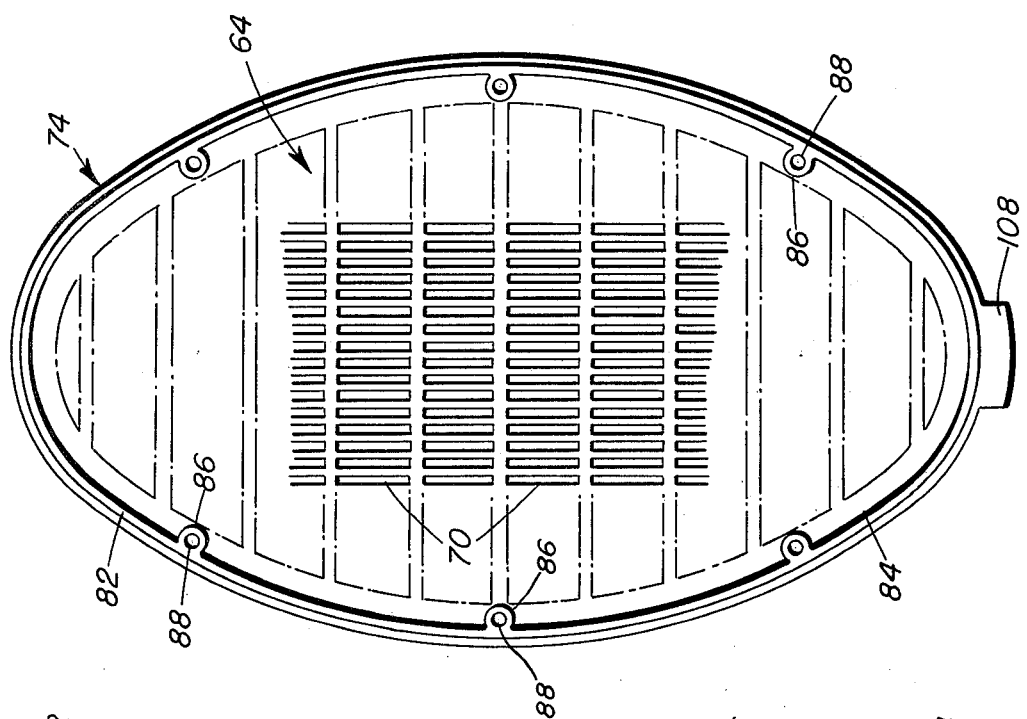
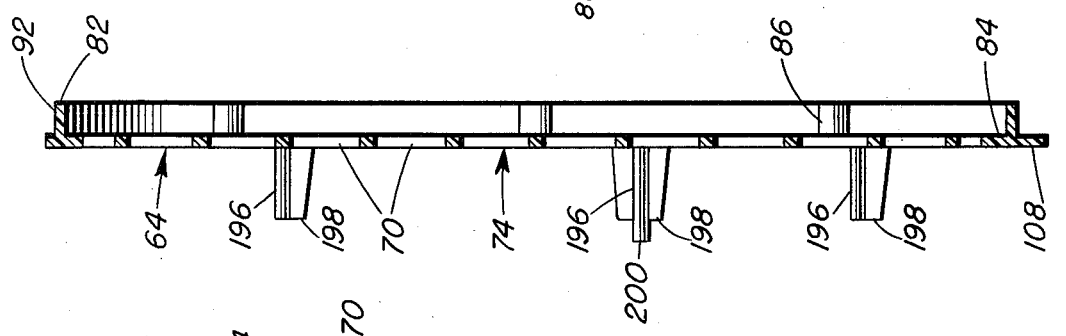
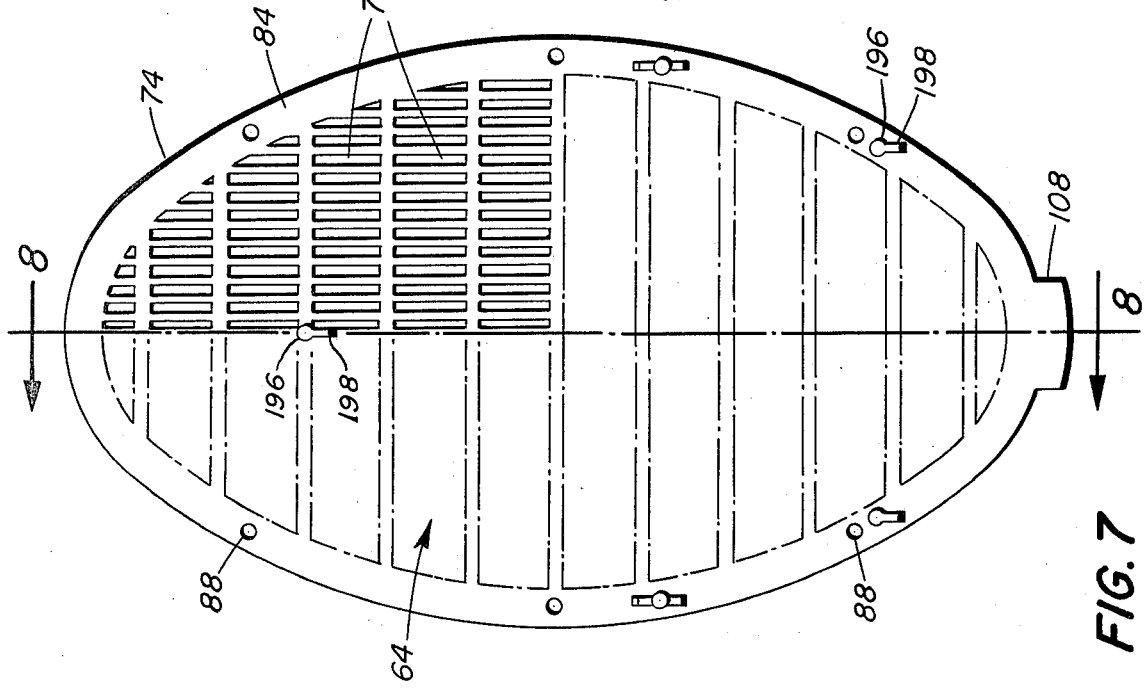

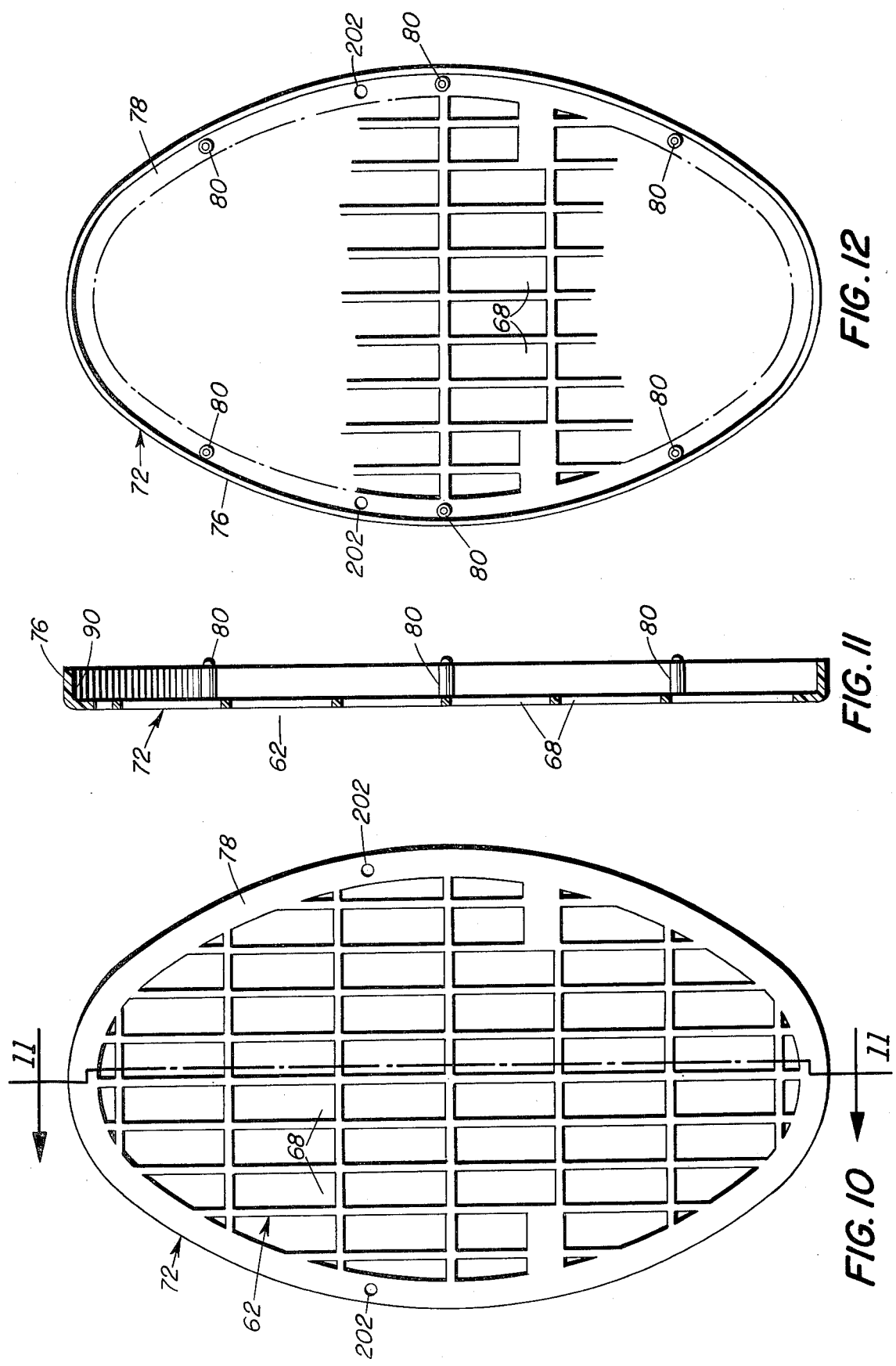

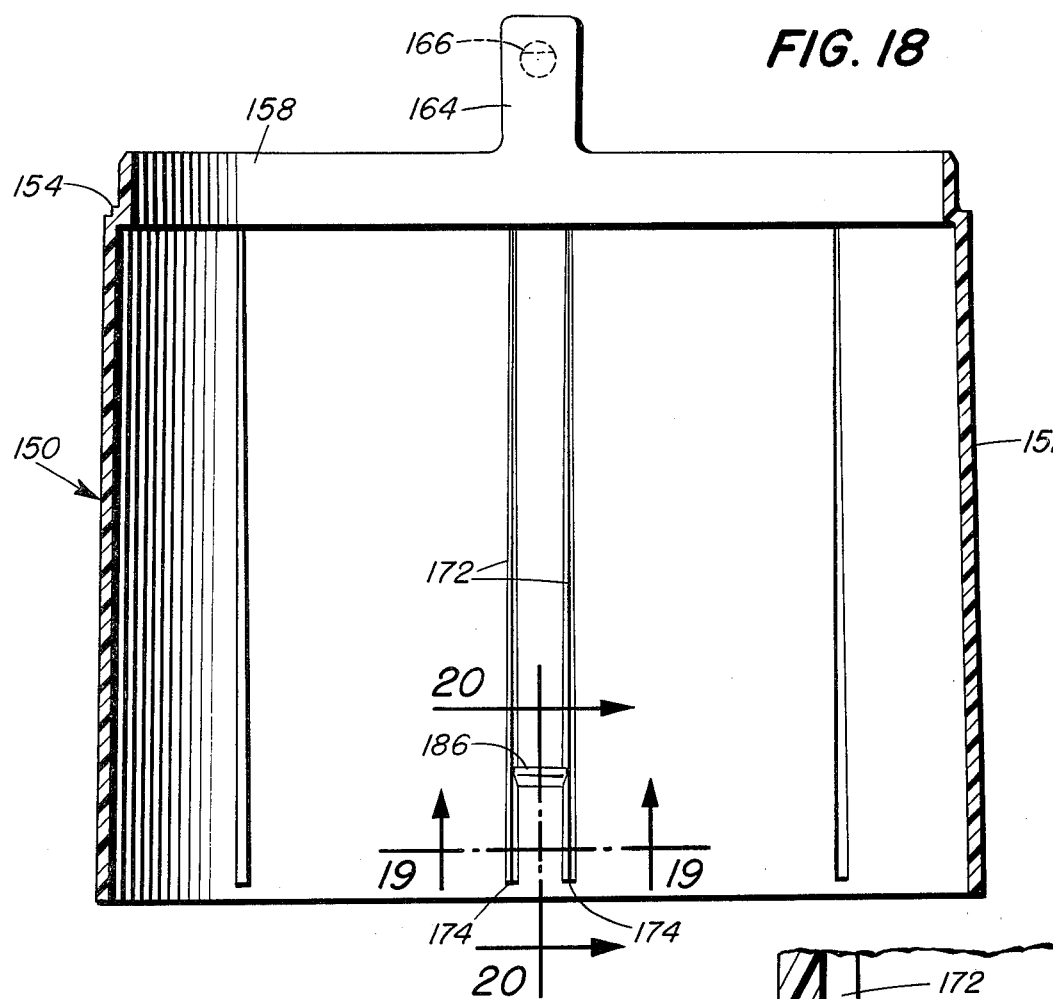
FIG. 18
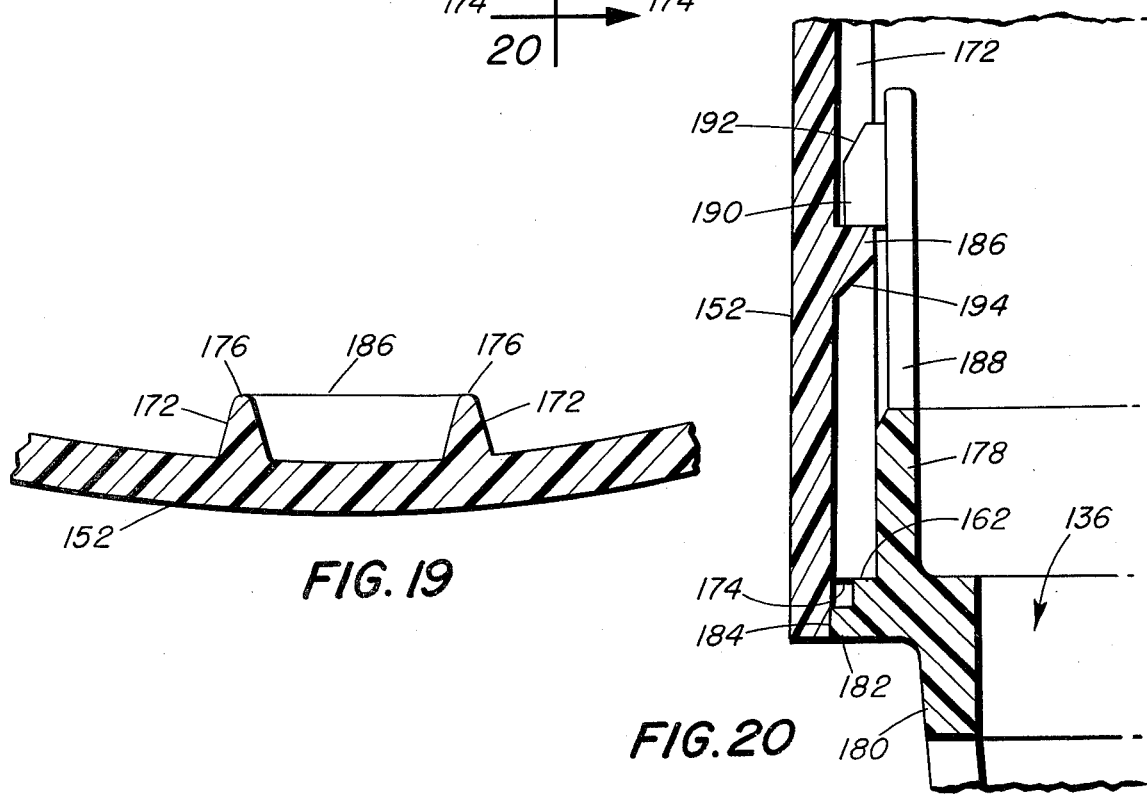
FIG. 19
FIG. 20

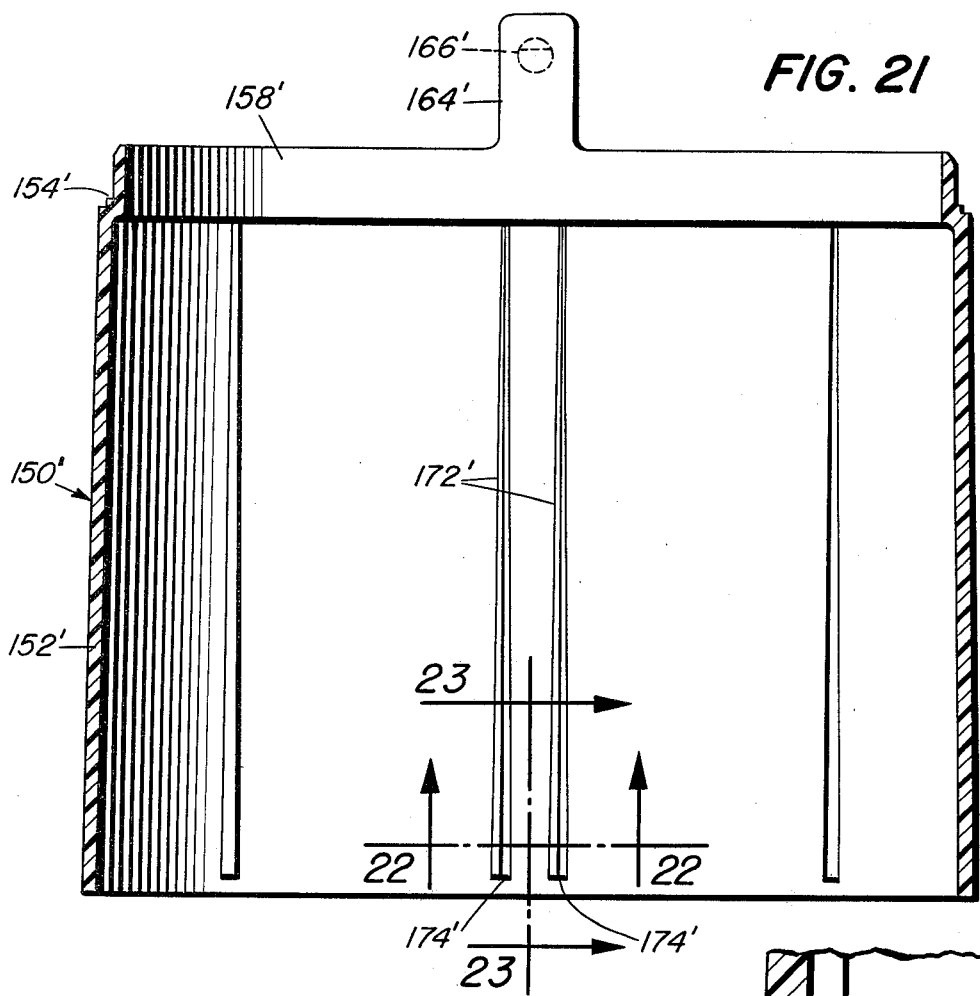
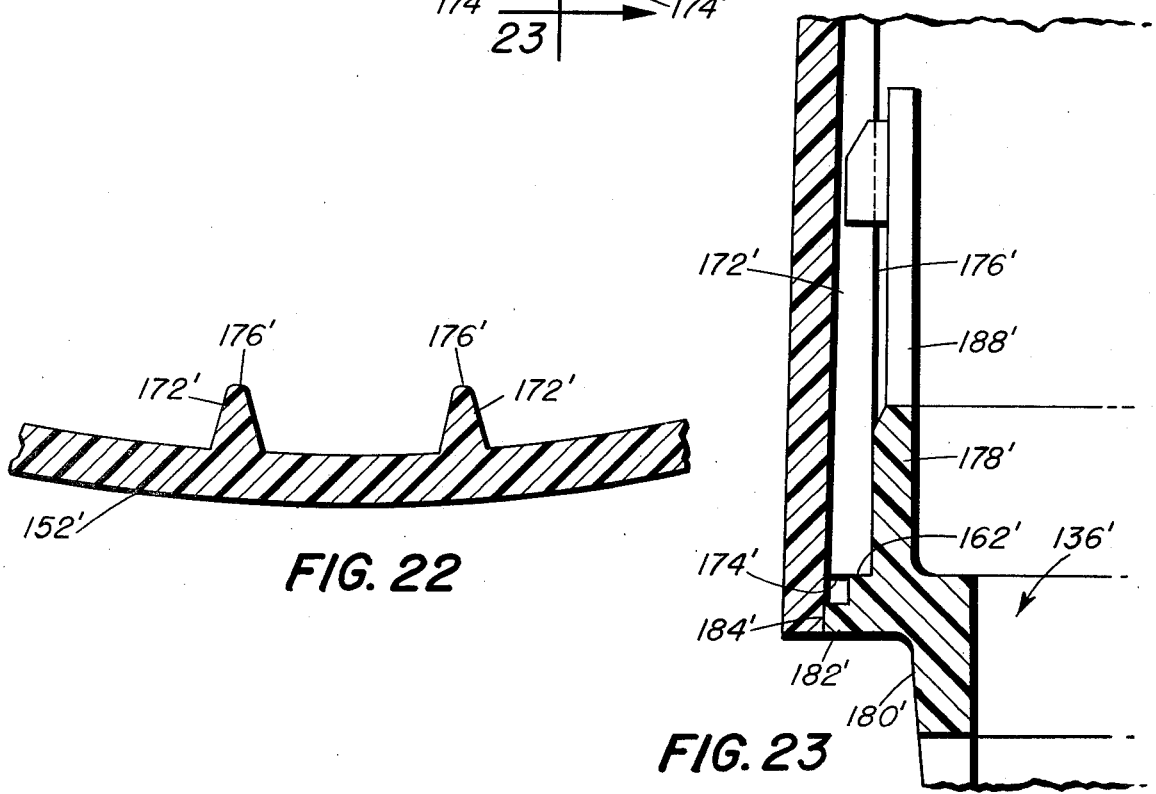

AIR FILTERING DEVICE

BACKGROUND OF INVENTION

This invention pertains to a room air filtering device having a motor driven fan for drawing air through one or more replaceable filters.

There has been increasing need in recent times for compact, electrically powered air filtering devices for removing offensive odors, smoke, dust, airborne bacteria and other undesirable airborne matter from room air both at home and in the work environment. Such devices need to be relatively small, unobtrusive and aesthetically pleasing in appearance so that they can be located anywhere desired such as on tabletops, desktops, workbenches and bathroom shelves, etc. They also should be easily maintainable.

SUMMARY OF THE INVENTION

An object of this invention is to provide a compact air filtering device which is relatively inexpensive to produce and easy to maintain.

An object of the invention is to provide an air filtering device having a minimum number of unitary structural elements which are easily disassembable for gaining access to the interior of the device for maintenance thereof and to change used filters.

An object of this invention is to provide a unique system for the interengagement of housing members in an air filtering device which permits disassembly and access to the interior of the device.

Another object of this invention is to provide a construction for an air filtering device by which one or more filters are positioned at an angle with respect to the axis of the device and the direction of air flow through the device whereby the surface area of each filter relative to the cross-sectional area of the device is increased thereby increasing the area of the filter face exposed to air flow. The orientation of the one or more filters at an angle with respect to the axis of the device and the direction of air flow also tends to cause air flow at an angle through each filter thereby tending to increase the functional depth of each air filter.

An object of the invention is to provide a structural system for positioning one or more filters in an air filtering device in such a manner as to make efficient use of the device's interior space while exposing a maximum surface area of each filter face to air flow.

An object of the invention is to provide a structural system for stacking multiple filters in a compact configuration within a filter device which spaces the filters with respect to one another, exposes a maximum surface area of each filter face to air flow, and requires only one structure for each filter regardless of stack position.

Another object of the invention is to provide an air filtering device which is readily adaptable to contain a varying number of filters therein through the addition of only one housing extension member and without modifying any of the other structural elements of the device.

These objects and others which will become apparent from a reading of this specification are achieved by an air filtering device adapted to convey air longitudinally therethrough from an intake at the top thereof to outlet means at the base thereof, comprising: fan means generally at the base of the device for drawing air generally longitudinally through the device and expelling the air adjacent the base of the device through the outlet means; a unitary lower fan enclosure member and a unitary upper fan enclosure member encasing the fan means, the lower fan enclosure member having the outlet means therein and including first mating means and second mating means, the second mating means being located adjacent the first mating means and laterally spaced exteriorly of the first mating means; the upper fan enclosure member having means for the passage of air therethrough and mating means for engaging the first mating means of the lower fan enclosure member for thereby encasing the fan means, the upper fan enclosure member and the lower fan enclosure member including means for interlocking themselves together; a filter for filtering air being conveyed through the device, the filter having a filter material enclosure containing filter material; filter positioning means in the upper fan enclosure member for receiving and positioning the filter above the upper fan enclosure member outside the upper and lower fan enclosure members at an angle with respect to the longitudinal axis of the device and the general direction of air flow through the device; a housing for enclosing the filter and the upper fan enclosure member, the housing having mating means for engaging the second mating means of the lower fan enclosure member thereby enclosing the filter and the upper fan enclosure member, the housing and the lower fan enclosure member including means for interlocking themselves together; and, the housing having inlet means therein, the inlet means comprising a planar surface with port means therethrough, the planar surface being disposed in a plane at an angle with respect to the longitudinal axis of the device equal to the angle of the filter, the inlet means being parallel to and immediately adjacent the filter, the periphery of the filter extending to the interior wall of the housing.

The housing may comprise a unitary upper housing member and a unitary intermediate housing member, the inlet means being located in the upper housing member and the mating means for engaging the second mating means of the lower fan enclosure member being located on the intermediate housing member. The intermediate housing member and the upper housing member respectively have mating means for interengaging one another and interlocking one another together.

The mating means and the locking means of the upper housing member are adapted in the absence of the intermediate housing member to engage the second mating means and locking means of the lower fan enclosure member whereby the size of the interior of the housing may be increased or decreased to accommodate a varying number of filters without varying the structure of the upper housing member or the lower fan enclosure member. Change in size is effected simply by the addition or the removal of the intermediate housing member.

The individual filters may be discs having parallel faces through which air flow occurs. Each filter comprises an enclosure containing a filter material. When a plurality of filters are stacked, the lowermost filter is positioned in the filter positioning means of the upper fan enclosure member while the uppermost filter is parallel to and immediately adjacent the inlet of the housing. The plurality of filters are disposed parallel to one another, each thereby being disposed at an angle with respect to the longitudinal axis of the device and the general direction of air flow through the device. The periphery of each of the plurality of filters extends to the interior wall of the housing. When a plurality of filters are stacked, the air filtering device includes filter stacking means for positioning and spacing the plurality of filters with respect to one another.

The various locking means and mating means are such that the housing or upper housing member and intermediate housing member are easily detachable from the lower fan enclosure member whereby easy access to the filter or filters contained within the housing is provided.

Additionally, the filters, whether one or more are used, can be readily removed from the device and replaced. The filter positioning means comprises a recess in the upper fan enclosure member for receiving a portion of a filter and a longitudinally extending shoulder means projecting from the upper fan enclosure member adjacent the recess for engaging the filter. The filter has at its lateral periphery a tab and the recess in the upper fan enclosure member includes a slot for receiving the tab. With a plurality of filters the filter positioning means is adapted to receive the lowermost filter. The additional filters are stacked above the lowermost filter by the stacking means.

The filter stacking means of each filter comprises means integrally formed on each of the filter enclosures for positioning and spacing each filter from the next adjacent filter when a plurality of filters are used. The filter stacking means of each filter is adapted for disconnection of the filters from one another.

BRIEF DESCRIPTION OF THE DRAWINGS

FIG. 5 is an exploded view of the upper and lower fan enclosure members of the air filtering device;

FIG. 6 is an enlarged detail view taken along the line 6—6 of FIG. 5;

FIG. 7 is a bottom plan view of the lower piece of a filter material enclosure according to the invention;

FIG. 8 is a sectional view taken along line 8—8 of FIG. 7;

FIG. 9 is a top plan view of the lower piece of the filter material enclosure of FIGS. 7 and 8;

FIG. 10 is a top plan view of the upper piece of a filter material enclosure according to the invention;

FIG. 11 is a sectional view taken along the line 11—11 of FIG. 10;

FIG. 12 is a bottom plan view of the upper piece of the filter material enclosure of FIGS. 11 and 12;

FIG. 18 is a sectional view of the intermediate housing member of the air filtering device of FIGS. 16 and 17;

FIG. 19 is an enlarged fragmentary sectional view taken along the line 19—19 of FIG. 18;

FIG. 20 is an enlarged fragmentary sectional view taken along the line 20—20 of FIG. 18;

FIG. 21 is a sectional view of a modified form of the intermediate housing member of FIG. 18;

FIG. 22 is an enlarged fragmentary sectional view taken along the line 22—22 of FIG. 21; and, FIG. 23 is an enlarged fragmentary sectional view taken along the line 23—23 of FIG. 21.

DESCRIPTION OF THE PREFERRED EMBODIMENT

Figure 1:
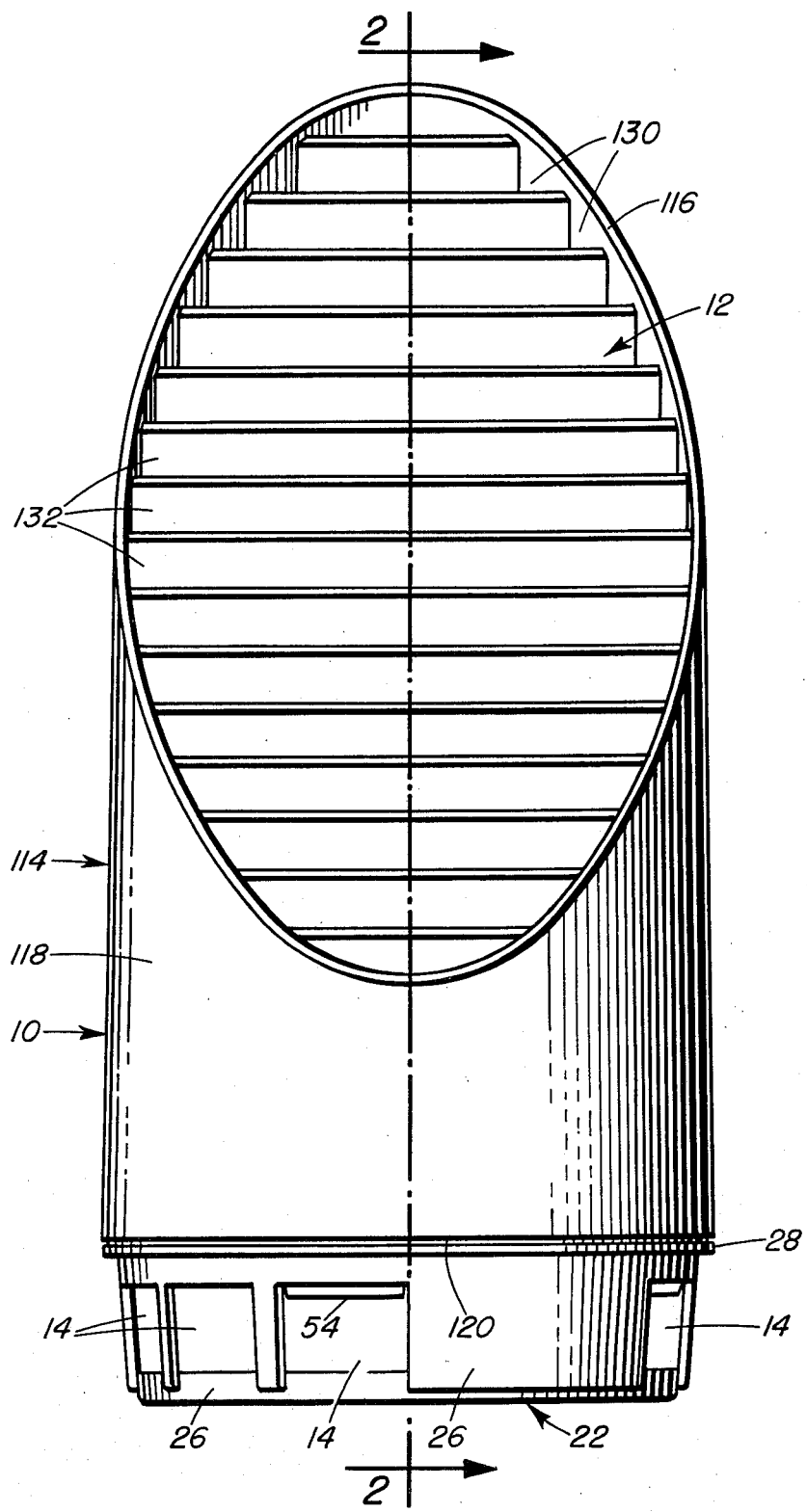
FIG. 1 is a front elevational view of an air filtering device according to the invention.
Figure 2:
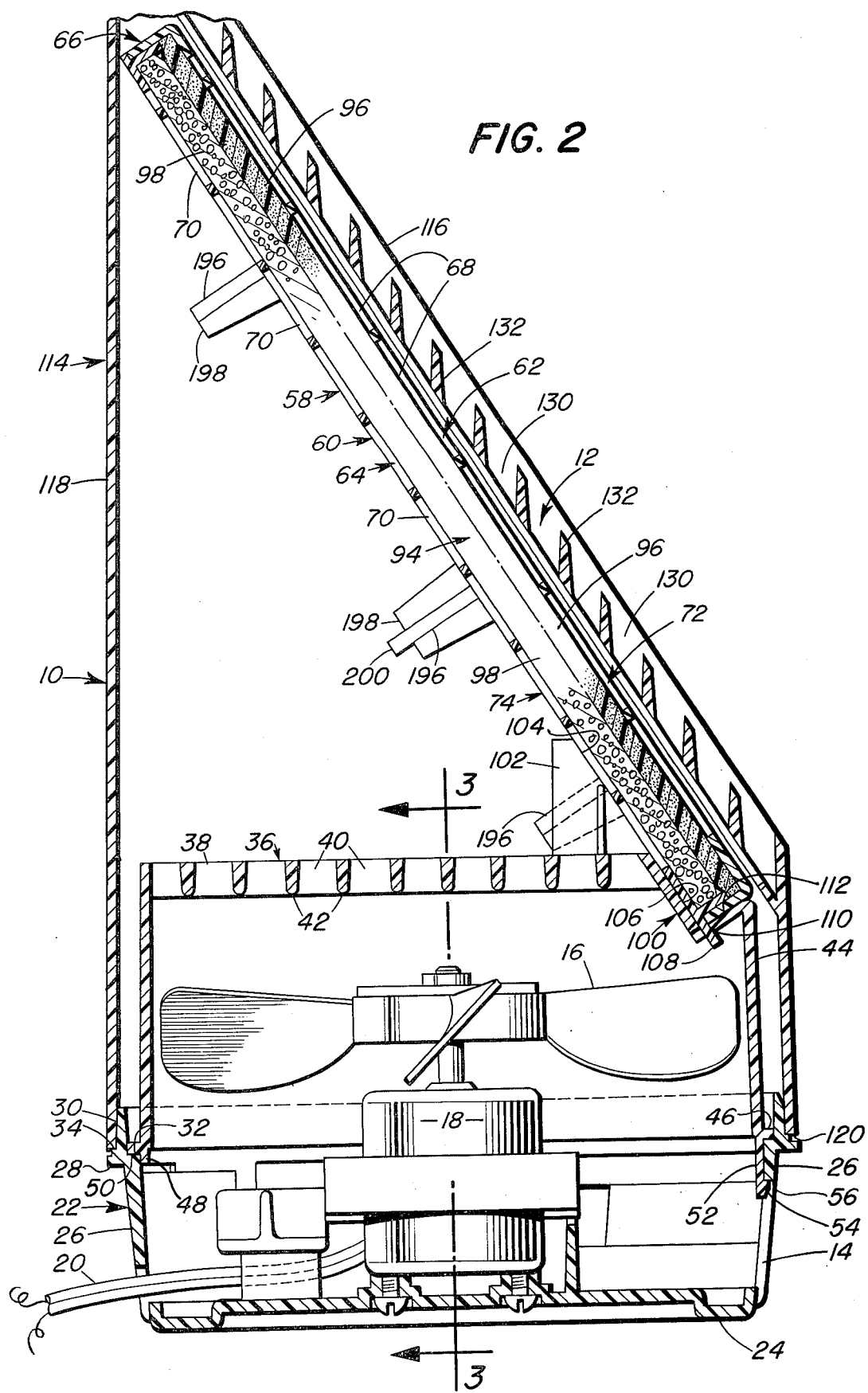
FIG. 2 is an enlarged fragmentary sectional view taken along the line 2—2 of FIG. 1.

Referring to FIGS. 1 and 2 an air filtering device 10 is shown adapted to operate vertically by drawing air longitudinally therethrough from an intake 12, filtering the air as it travels downwardly through the device 10, and expelling the air through the outlet ports 14 adjacent the base of the device 10. Air is drawn through the device by a fan 16 driven by an electric motor 18. An electric conduit 20 extends from the electric motor 18 out of the device 10 to a source of electricity for providing power to the motor 18. The fan 16 and motor 18 are mounted at the base of the device 10 in a lower fan enclosure member 22 of unitary construction having a base 24 and a generally cylindrical longitudinally extending lateral wall 26. The outlets 14 for exhausting air from the device 10 are located in this lateral wall 26. The lateral wall 26 has a laterally extending annular portion 28 adjacent the top thereof from the midportion of which projects a longitudinally extending annular portion 30 of the wall 26. The lateral portion 28 and the longitudinal portion 30 form a first annular or circular shoulder 32 on the inside of the lateral wall 26 and a second annular or circular shoulder 34 on the outside of the lateral wall 26 adjacent the first shoulder 32 and laterally spaced exteriorly of the first shoulder 32, the two shoulders 32, 34 being separated by the longitudinally extending annular portion 30. Both shoulders 32, 34 lie in planes generally perpendicular to the longitudinal axis of the device 10 and face in the same longitudinal direction. The planes in which the shoulders 32, 34 lie are parallel and slightly spaced.

Interlocked with the lower fan enclosure member 22 is an upper fan enclosure member 36 of unitary construction which together with the lower fan enclosure member 22 encases the fan 16 and electric motor 18. Referring to FIGS. 2 through 5 the upper fan enclosure member 36 has a flat top surface 38 disposed in a plane generally perpendicular to the longitudinal axis of the device 10 and has therein a plurality of air passages 40 for the passage of air therethrough. The air passages 40 are arranged in a rectangular grid formed by vanes 42. The vanes 42 are disposed parallel to the longitudinal axis of the device 10 to assist in guiding the longitudinal flow of the air being drawn through the device 10. The upper fan enclosure member 36 also includes a generally cylindrical longitudinally extending lateral wall 44 extending downwardly from the top surface 38 to annular members 46 and 48. The annular members 46 extend laterally from the lateral wall 44 adjacent the bottom thereof forming generally annular or circular shoulders 50 lying in a plane generally perpendicular to the longitudinal axis of the device 10 in a manner similar to that of the first shoulder 32 of the lower fan enclosure member 22. The annular shoulders 50 are opposed to the first shoulder 32 and are adapted for mating with the first shoulder 32. The annular member 48 extends longitudinally from the lateral wall 44 and serves as a guide in joining the upper fan enclosure member 36 with the lower fan enclosure member 22 and as a reinforcing member in the interengagement of the two enclosure members 22, 36 by coming into sliding engagement with the interior of the lateral wall 26 adjacent the laterally extending portion 28 of the lateral wall 26.

The upper fan enclosure member 36 and the lower fan enclosure member 22 include members for detachably locking or latching the enclosure members together. Extending longitudinally downward from the bottom of the lateral wall 44 of the upper fan enclosure member 36 are at least two longitudinally extending locking or latching members 52 of limited thickness. The locking members 52 are incorporated in the annular member 48 for part of their respective lengths and have a thickness less than the thickness of the lateral wall 44 whereby they are rendered semi-rigid and capable of being bent laterally. Adjacent the tip of each member 52 is a lateral protrusion or bead 54 facing outwardly on each locking member 52. When the upper fan enclosure member 36 and the lower fan enclosure member 22 are in engagement with their shoulders 32, 50 mated in opposed contact the lateral protrusions 54 of the locking members 52 engage the upper surfaces 56 of some of the outlet ports 14 thereby locking the lower fan enclosure member 22 and upper fan enclosure member 36 together. Alternatively, separate openings may be provided in the lateral wall 26 for the purpose of engaging the locking members 52. The two enclosure members 22, 36 may be detached from one another by bending the locking members 52 inwardly out of engagement with the surfaces 56. In bringing the upper fan enclosure member 36 and the lower fan enclosure member 22 into engagement the locking members 52 are bent inwardly as the protrusions 54 slide over the interior surface of the lateral wall 26 of the lower fan enclosure member 22 until the protrusions 54 reach the outlet ports 14 at which point the locking members 52 snap into their rest positions locking the two enclosure members 22, 36 together.

Referring to FIGS. 2 and 7 through 15, positioned above the upper fan enclosure member 36 in the device 10 is a filter 58 for filtering the air being conveyed through the device 10. The filter 58 has an elliptical disc shape formed by a filter material enclosure 60 having first and second planar spaced parallel elliptical faces 62, 64 joined about their perimeters by a peripheral wall 66 perpendicular to the two faces 62, 64. Each elliptical face 62, 64 has therein a plurality of openings 68, 70 for the passage of air through the filter 58. The filter material enclosure 60 comprises an upper unitary piece 72 and a lower unitary piece 74.

The upper piece 72 includes the elliptical first face 62 and a peripheral flange 76 extending perpendicularly from the elliptical first face 62. About the periphery of the first face 62 between the peripheral flange 76 and the plurality of openings 68 is a border strip 78 having no openings therein. Projecting from the first face 62 at this border 78 in the same direction as the peripheral flange 76 are a plurality of projections 80 distributed about the periphery of the upper piece 72.

The lower piece 74 comprises the second planar elliptical face 64 and a peripheral flange 82 located adjacent the periphery of the second face 64 and projecting therefrom perpendicularly with respect to the plane of the second face 64. The flange 82 is slightly indented from the very edge of the second face 64 by a distance approximately equal to the thickness of the peripheral flange 76 of the upper piece 72. The lower piece flange 82 is approximately equal in height to the upper piece flange 76. Similar to the border 78 in the upper piece 72, the lower piece 74 has in its face 64 at the periphery thereof between the plurality of openings 70 and the flange 82 a border strip 84 having no openings therethrough. Situated on this border strip 84 about the periphery of the lower piece 74 are a plurality of socket members 86 projecting in the same direction as the peripheral flange 82 to which they are joined at their outside lateral edges. Each socket member 86 has an opening 88 therein.

The upper piece 72 and the lower piece 74 are adapted to be joined by means of the peripheral flanges 76 and 82 and the socket members 86 and corresponding projections 80. The inside face 90 of the peripheral flange 76 is adapted to come into sliding engagement with the outside face 92 of the peripheral flange 82 to form thereby the peripheral wall 66 of the filter material enclosure 60. The end extremity of the peripheral flange 76 abuts the fringe of the planar face 64 extending beyond the flange 82. The projections 80 are received by the socket openings 88 in a friction fit similar to that between the flanges 76 and 82 so that the upper and lower pieces 72, 74 are firmly joined together with their junction reinforced by the interengagement of the spaced socket openings 88 and projections 80. The joined upper and lower pieces 72, 74 thereby form the filter material enclosure 60.

Contained within the filter material enclosure 60 is filter material 94 comprising a layer of thermoplastic foam 96 adjacent the inside of the first face 62 and a layer of activated charcoal 98 adjacent the inside of the second face 64. The sizes of the openings 68, 70 in the respective faces 62, 64 are dimensioned so as to retain the filter material 94.

Figure 4:
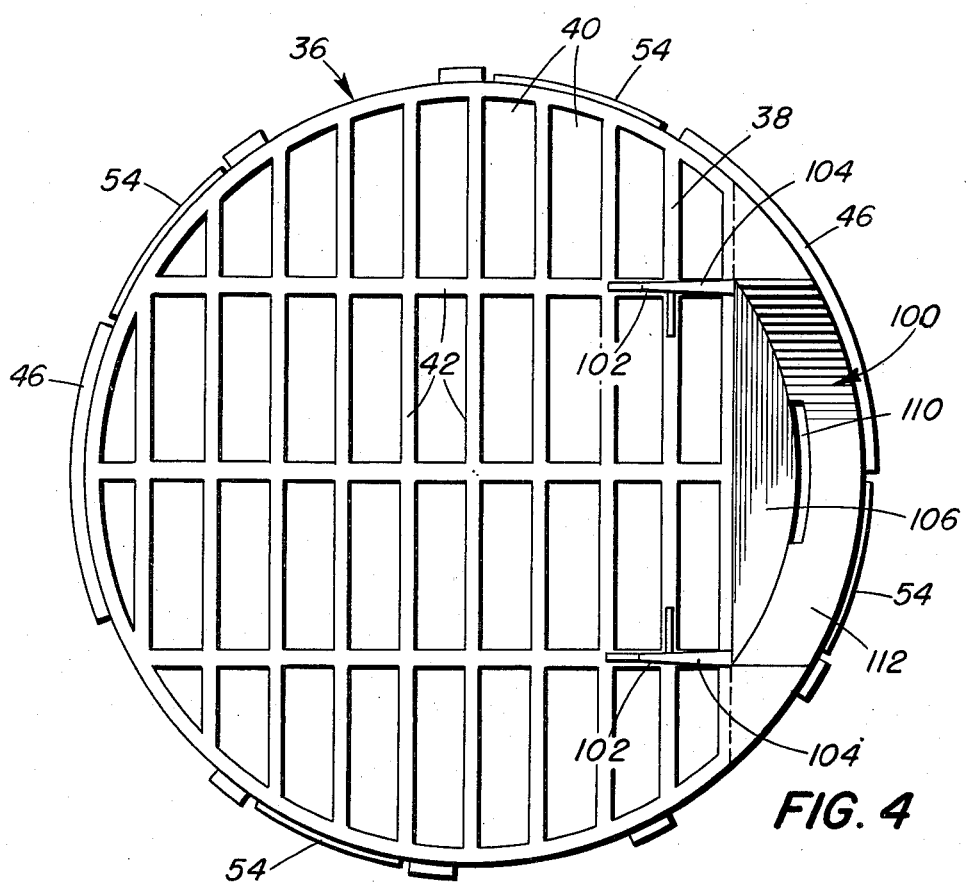
FIG. 4 is a top plan view of the upper fan enclosure member of the air filtering device.
Figure 13:
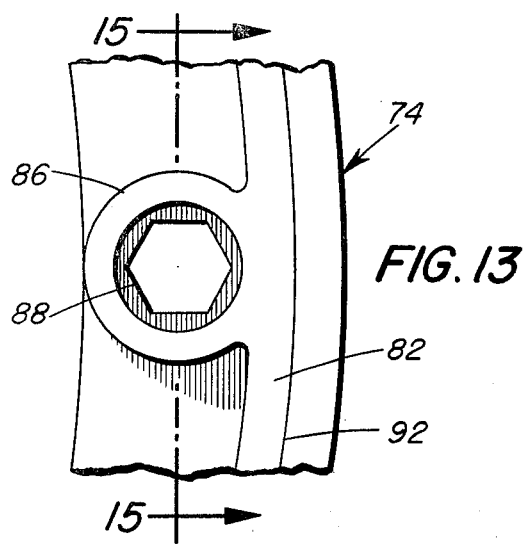
FIG. 13 is an enlarged fragmentary top plan view of a socket member in the lower piece of the filter material enclosure of FIG. 9.
Figure 14:
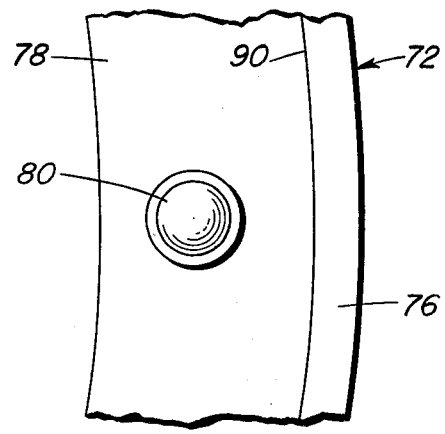
FIG. 14 is an enlarged fragmentary bottom plan view of a projection on the upper piece of the filter material enclosure of FIG. 12.
Figure 15:
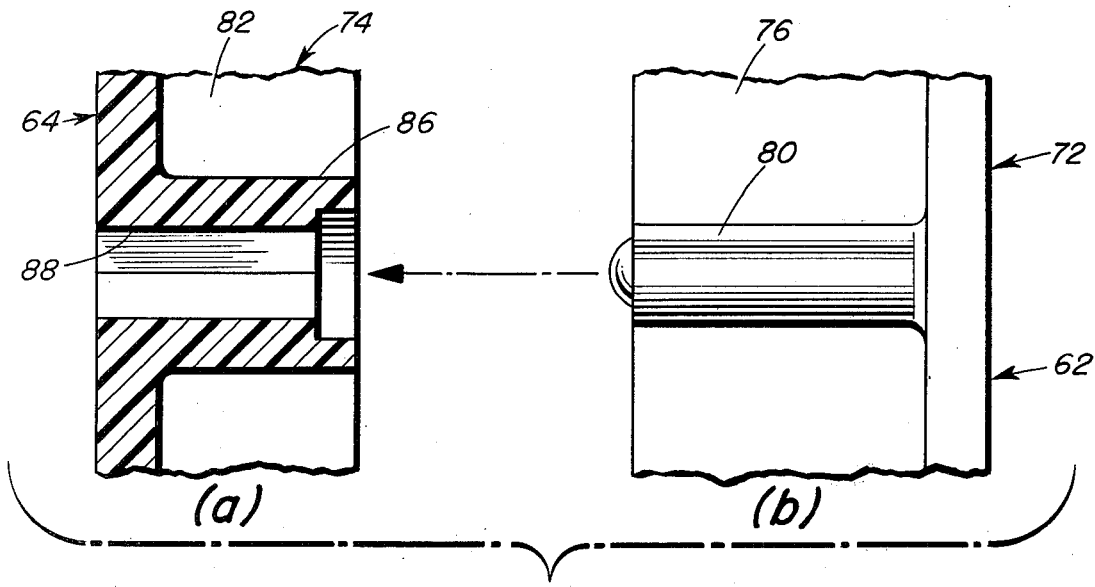
FIG. 15 is an enlarged exploded view showing the interrelationships of the socket member and projection of FIGS. 13 and 14, FIG. 15a being a view partially in section taken on the line 15—15 of FIG. 13 and FIG. 15b being a side elevational view of the fragment of the upper piece of the filter material enclosure of FIG. 14.
Figure 16:
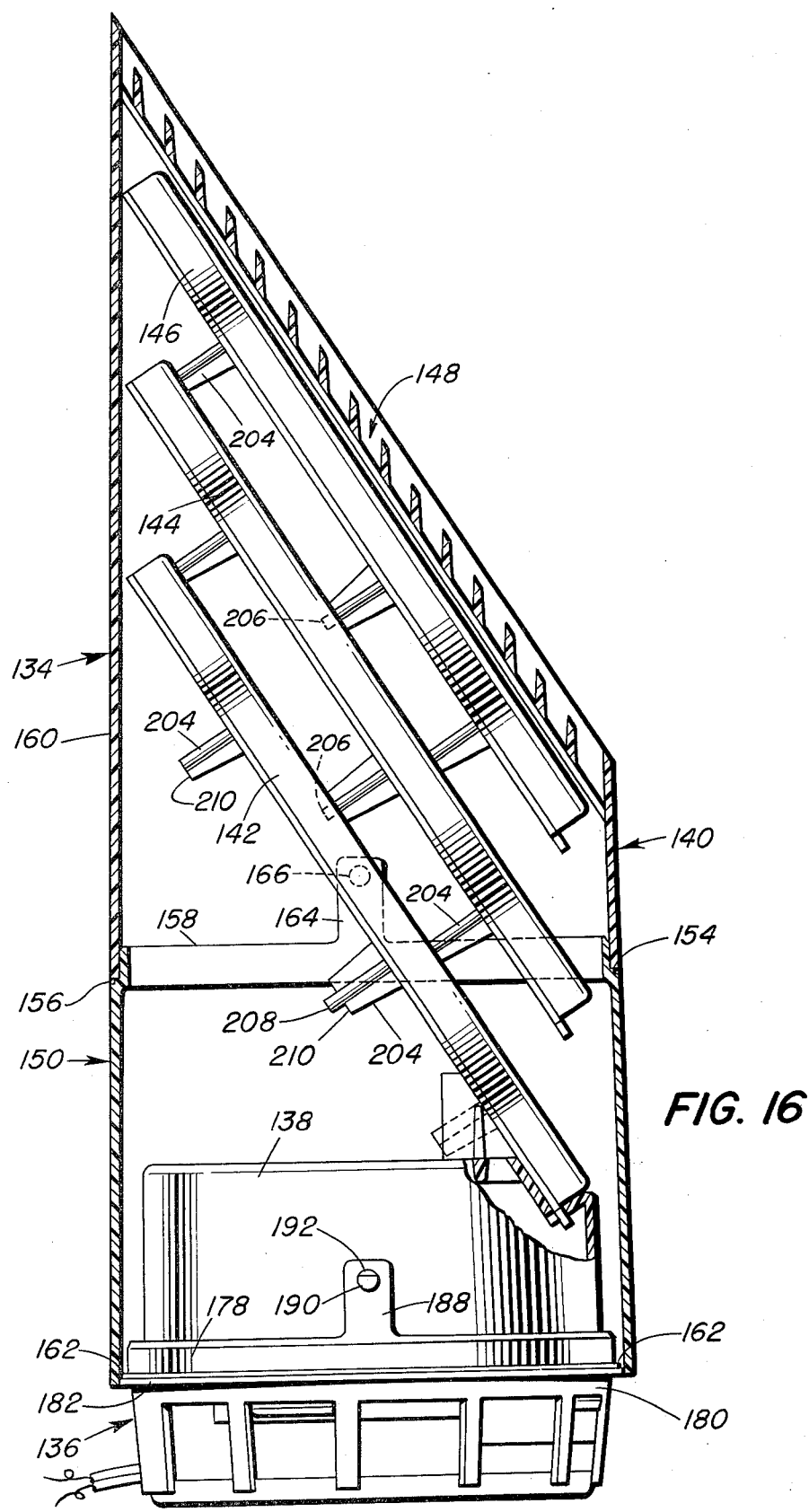
FIG. 16 is a sectional view of a modified air filtering device according to the invention.
Figure 17:
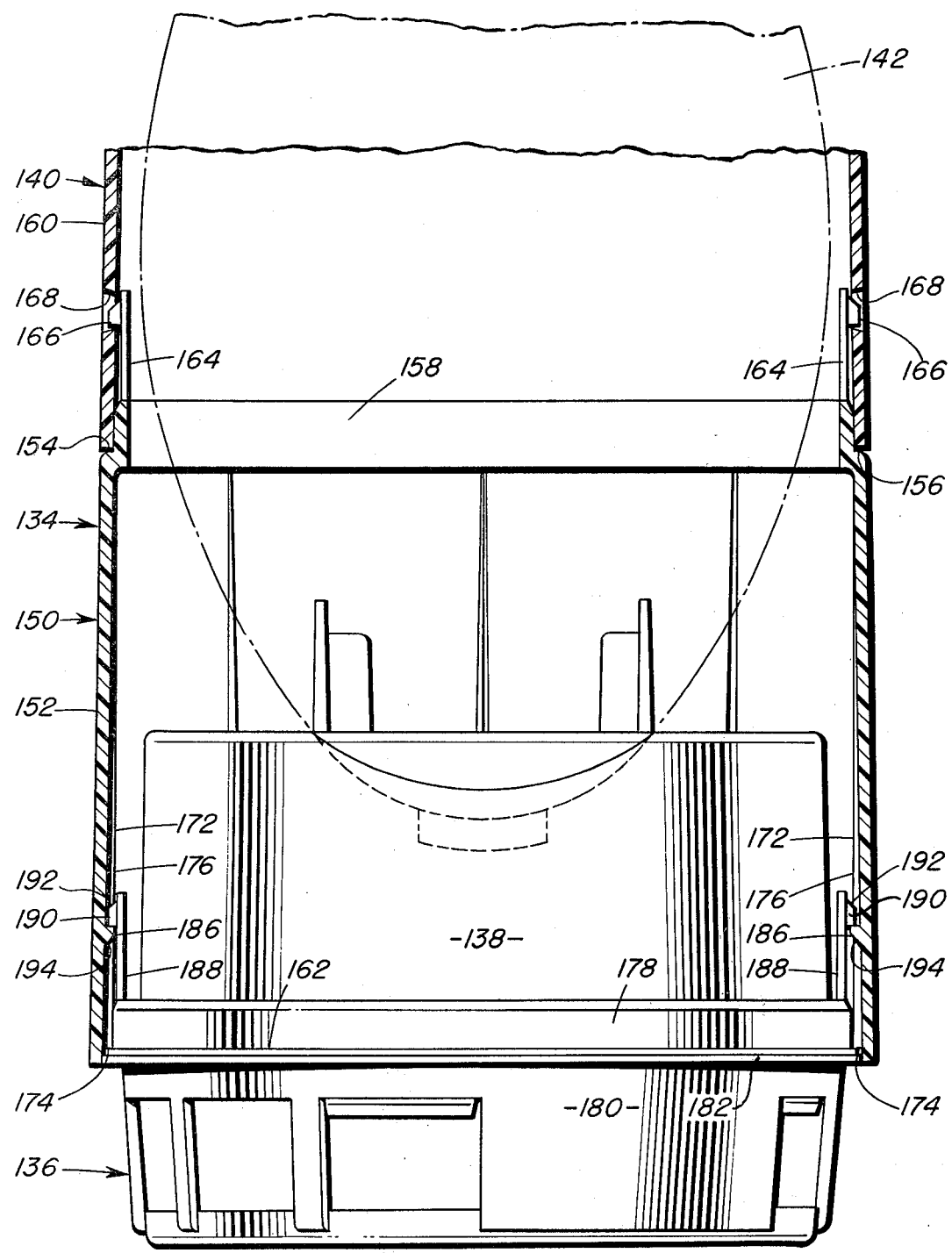
FIG. 17 is an enlarged fragmentary view partially in section of the modified air filtering device of FIG. 16 with parts omitted for clarity.

Referring to FIGS. 2, 4 and 5, a recess 100 is located in the upper fan enclosure member 36 at the juncture of the top surface 38 and the lateral wall 44 of the upper fan enclosure member 36. Projecting from the top surface 38 of the upper fan enclosure member 36 adjacent the recess 100 are two longitudinally extending shoulders 102 each having an edge 104 which together with a planar surface 106 of the recess 100 define a plane at an angle with respect to the longitudinal axis of the device 10. The recess 100 and the shoulders 102 are adapted to receive and hold in position the filter 58 at an angle with respect to the longitudinal axis of the device 10 and thereby at the same angle with respect to the general direction of flow of air through the device 10. The causes 100 and the shoulders 102 receive that portion of the filter 58 adjacent the peripheral wall 66 of the filter 58 at one of the points where the major axis of the ellipse formed by the filter 58 passes through the peripheral wall 66.

Projecting laterally from the peripheral wall 66 of the filter 58 is a tab 108 situated at the point where the major axis of the ellipse formed by the filter 58 passes through the peripheral wall 66. The tab 108 is a unitary projection of the second filter face 64 and forms a part of the lower filter piece 74. The filter 58 is held in position by this tab 108 which is inserted into a slot 110 in the upper fan enclosure member 36 located adjacent the base of the recess surface 106. In this position the peripheral wall 66 of the filter 58 abuts against a second recess surface 112 perpendicular to the first recess surface 106 and having a contour generally identical to the elliptical shape of the periphery of the filter 58.

Figure 3:
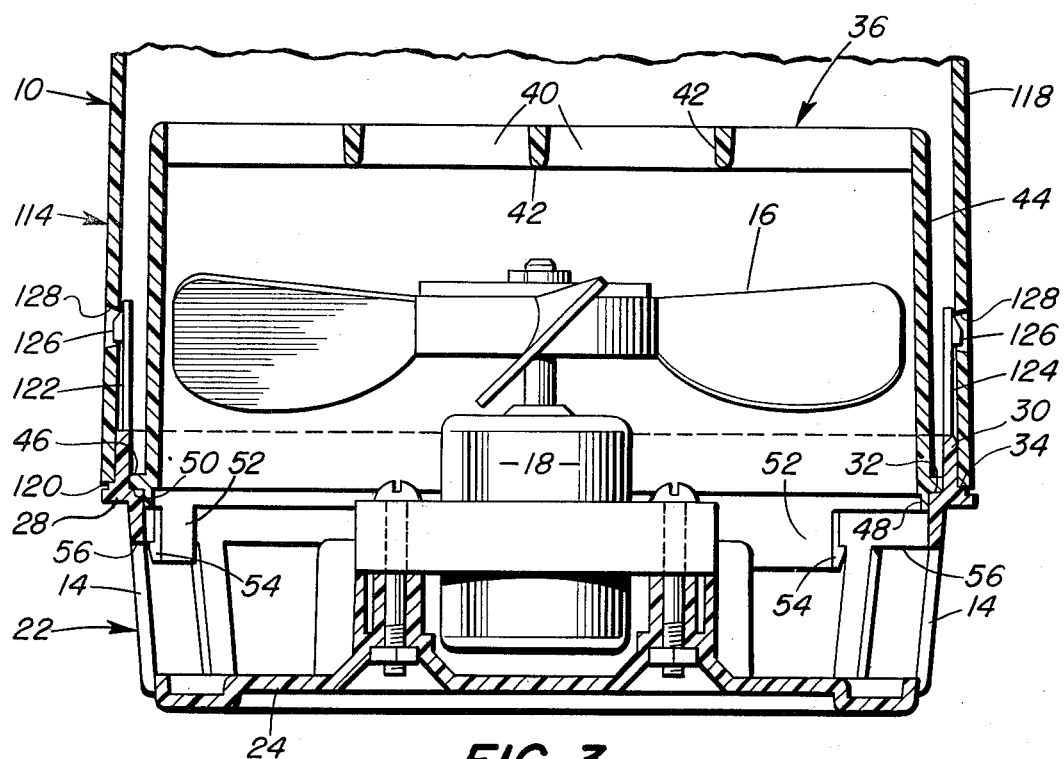
FIG. 3 is an enlarged fragmentary sectional view taken along the line 3—3 of FIG. 2.

With reference to FIGS. 1, 2 and 3, enclosing the filter 58 and the upper fan enclosure member 36 and holding the filter 58 in position on the upper fan enclosure member 36 is a housing 114 having a top surface 116 and a generally cylindrical longitudinally extending lateral wall 118. The wall 118 terminates in an annular mating shoulder 120 lying in a plane generally perpendicular to the longitudinal axis of the device 10. This shoulder 120 is adapted to engage the second mating shoulder 34 of the lower fan enclosure member 22 and for this purpose is opposed to the second mating shoulder 34 and faces in the longitudinal direction toward the base of the device 10. The mating shoulder 120 is circular in configuration. The lateral wall 118 of the housing 114 has at the mating shoulder 120 a diameter equal to that of the second mating shoulder 34 of the lower fan enclosure member 22 and slightly greater than the diameter of the longitudinally extending annular portion 30 of the lateral wall 26 whereby the housing 114 is adapted to engage the lower fan enclosure member 22 by its circular mating shoulder 120 coming into abutting contact with the second mating shoulder 34 and with the inside surface of its lateral wall 118 adjacent the shoulder 120 coming into overlapping sliding engagement with the outside surface of the annular portion 30 of the lateral wall 26 of the lower fan enclosure member 22 to provide reinforcement to the interengagement of the lower fan enclosure member 22 and the housing 114. With this arrangement the housing 114, having a diameter greater than that of the upper fan enclosure member 36, is positioned concentrically with respect to the upper fan enclosure member 36 which it encloses.

The housing 114 and the lower fan enclosure member 22 include members for detachably locking or latching themselves together. Projecting longitudinally and upwardly from the annular portion 30 of the lateral wall 26 of the lower fan enclosure member 22 are two flexible arm members 122, 124 which each have a portion of reduced thickness with respect to the thickness of the annular portion 30 thereby rendering them semi-rigid and flexible. Adjacent the end of each arm member 122, 124 is a laterally projecting bead member or protrusion 126. Each lateral protrusion 126 is positioned to engage an opening 128 in the lateral wall 118 of the housing 114 when the housing 114 and the lower fan enclosure member 22 are in engagement with their mating shoulders 34, 120 in opposed contact. In bringing the housing 114 and the lower fan enclosure member 22 into engagement the flexible arm members 122, 124 are bent inwardly as the lateral protrusions 126 slide over the interior surface of the lateral wall 118 of the housing 114 until the protrusions 126 reach the openings 128 at which point the flexible arm members 122, 124 snap into their rest positions locking the housing 114 and the lower fan enclosure member 22 together. The housing 114 and the lower fan enclosure member 22 may be detached from one another by pressing the protrusions 126 radially inward through the openings 128 while simultaneously lifting the housing 114 away from the lower fan enclosure member 22.

Located in the top surface 116 of the housing 114 is the intake 12 for the device 10. The intake 12 comprises a plurality of ports 130 in the top surface 116 separated by a series of parallel louver boards 132. The top surface 116 is generally planar and has an elliptical shape corresponding generally to the elliptical configuration of the filter 58 and is disposed at an angle with respect to the longitudinal axis of the device 10 equal to the angle assumed by the filter 58 when positioned in the recess 100 and on the shoulders 102 of the upper fan enclosure member 36. The housing 114 is arranged so that when in engagement with the lower fan enclosure member 22 and radially positioned so as to be locked thereto by means of the flexible arm members 122, 124 and their protrusions 126, the top surface 116 lies parallel to and immediately adjacent the first face 62 of the filter 58 whereby the filter 58 is retained in position and the plurality of ports 130 lie parallel to and immediately adjacent the filter 58. The louver boards 132 are disposed in the top surface 116 so that when the housing 114 is in this configuration, the louver boards 132 are disposed parallel to the longitudinal axis of the device 10 and thereby tend to direct inflowing air longitudinally through the device 10 and tend to direct air flow through the filter 58 in a general direction at an angle with respect to the plane of the filter 58 complementing the angle at which the filter 58 is disposed with respect to the longitudinal axis of the device 10.

The elliptical shape of the filter 58 is selected with respect to the angle at which the filter 58 will lie with respect to the longitudinal axis of the device 10 so that the periphery of the filter 58 will extend to the interior of the generally circular lateral wall 118 of the housing 114 all around the periphery of the filter 58 thereby minimizing air flow around the filter 58.

Referring to FIGS. 16 through 20, a modified form 134 of an air filtering device according to the invention is shown. Most of the components of the modified air filtering device 134 are similar to or identical to the corresponding components in the air filtering device 10. These include the fan and electric motor (not shown), lower fan enclosure member 136, upper fan enclosure member 138, and an upper housing member 140, each of unitary construction. The structure of the filter 142 also is identical to the filter 58 of device 10. However, the device 134 includes three such filters having also filters 144 and 146 identical in structure to the filter 142. The lowermost filter 142 is received and positioned in the upper fan enclosure member 138 in a manner identical to that in the device 10 at an angle with respect to the longitudinal axis of the device 134 and the general direction of air flow through the device 134. The second and third filters 144, 146 are positioned parallel to the first filter 142 and are staggered in relation to one another and with respect to the filter 142 so that their respective peripheries are longitudinally aligned defining a cylinder in overall configuration. The uppermost filter 146 in a manner similar to that of the filter 58 in device 10 is parallel to and immediately adjacent the inlet 148 in the top surface of the housing 140. The filters 144 and 146 are in a manner identical to that for filter 142 thereby disposed at an angle with respect to the longitudinal axis of the device 134 and the general direction of air flow through the device 134 equal to the angle of the filter 142.

To accomodate the two additional filters 144, 146 the air filtering device 134 includes in addition to the upper housing member 140 an intermediate housing member 150 of unitary construction positioned between the lower fan enclosure member 136 and the upper housing member 140 to increase the space within the device 134 between the upper fan enclosure member 138 and the air inlet 148. The intermediate housing member 150 has a generally cylindrical lateral wall 152 and a generally annular or circular mating shoulder 154 on its lateral wall 152 at the upper longitudinal end thereof lying in a plane generally perpendicular to the longitudinal axis of the device 134. The annular shoulder 154 is opposed to the annular shoulder 156 of the upper housing member 140 and is adapted for mating therewith by coming into abutting contact to interengage the intermediate housing member 150 and the upper housing member 140. The lateral wall 152 of the intermediate housing member 150 includes an annular portion 158 extending longitudinally upward beyond the mating shoulder 154. The wall of the upper housing member 140 has at its mating shoulder 156 a diameter equal to that of the mating shoulder 154 and slightly greater than the diameter of the longitudinally extending portion 158 whereby when the upper housing member 140 and the intermediate housing member 150 are interengaged with their respective mating shoulders 154, 156 in opposed abutting contact, the inside surface of the lateral wall 160 of the upper housing member 140 adjacent the mating shoulder 156 comes into overlapping sliding engagement with the outside surface of the annular portion 158 of the lateral wall 152 of the intermediate housing member 150 to provide reinforcement to the interengagement of the upper housing member 140 and the intermediate housing member 150.

The structure for interengaging the upper housing member 140 and intermediate housing member 150 is therefore similar to the structure for interengaging the upper housing member 140 and the lower fan enclosure member 136. In the absence of the intermediate housing member 150, the upper housing member 140 may be engaged directly to the lower fan enclosure member 136 with mating shoulder 156 of the upper housing member 140 in opposed abutting contact with the annular mating shoulder 162 of the lower fan enclosure member.

Two longitudinally extending flexible arm members 164 are also provided for detachably interlocking or interlatching the upper housing member 140 and the intermediate housing member 150. These members 164 have laterally extending beads or protrusions 166 thereon which cooperate with a corresponding number of laterally extending openings 168 in the wall 160 of the upper housing member 140 in a manner similar to that of the locking arm members 122, 124 and openings 128 of the housing 114 and the lower fan enclosure member 22 of the device 10.

Members are also provided for interengaging the intermediate housing member 150 and the lower fan enclosure member 136. The upper housing member 140 increases gradually in diameter progressing from top to bottom thereby creating a more aesthetically pleasing appearance. The intermediate housing member 150 similarly increases gradually in diameter from top to bottom having a diameter towards the top thereof generally equal to the diameter at the base of the upper housing member 140. Since the wall 160 at the base of the upper housing member 140 is of a size adapted for engagement with the annular shoulder 162 of the lower fan enclosure member 136, the lateral wall 152 of the intermediate housing member 150 is necessarily greater in diameter towards its base than the diameter of the annular shoulder 162 of the lower fan enclosure member 136. Accordingly, longitudinally extending parallel ribs 172 are situated on the inside surface of the lateral wall 152 of intermediate housing member 150 terminating slightly above the lower end of the intermediate housing member 150 in shoulders 174. The shoulders 174 are disposed in a plane generally perpendicular to the longitudinal axis of the device 134 opposed to the annular shoulder 162 of lower fan enclosure member 136 and are adapted to engage the annular shoulder 162 by coming into abutting contact with the annular shoulder 162.

To reinforce the interengagement of the intermediate housing member 150 and the lower fan enclosure member 136 the longitudinally extending edge 176 of each rib 172 comes into overlapping sliding engagement with the outside surface of the longitudinally extending annular portion 178 of the lateral wall 180 of lower fan enclosure member 136. Similar to the structure of the lateral wall 26 of lower fan enclosure member 22, the lateral wall 180 of lower fan enclosure member 136 also includes a laterally extending portion 182 which together with the annular portion 178 defines the annular shoulder 162 of lower fan enclosure member 136. The laterally extending portion 182 ends in an outside edge 184 which also provides reinforcement to the interengagement of the intermediate housing member 150 and the lower fan enclosure member 136. When the intermediate housing member 150 and the lower fan enclosure member 136 are interengaged, the outside edge 184, forming a circular laterally projecting flange, abuts the inside surface of the lateral wall 152 of the intermediate housing member 150 immediately adjacent the base of the intermediate housing member 150.

For detachably locking or latching the lower fan enclosure member 136 and the intermediate housing member 150 together, two locking ribs 186 are located on the lateral wall 152 of the intermediate housing member 150 between pairs of closely spaced longitudinally extending parallel ribs 172. Each locking rib 186 lies in a plane generally perpendicular to the longitudinal axis of the device 134. Extending longitudinally from the lower fan enclosure member 136 are flexible arm members 188 corresponding in number and position to the locking ribs 186. The flexible arm members 188 are similar in construction to the arm members 122, 124 of lower fan enclosure member 22 and function to a similar manner to lock the intermediate housing member 150 to the lower fan enclosure member 136 by coming into overlapping opposed engagement with the locking ribs 186. So that the arm members 188 will deflect laterally inwardly as the intermediate housing member 150 is brought into engagement with the lower fan enclosure member 136 the lateral protrusions 190 on the arm members 188 each have sloping top surfaces 192 which cooperate with sloping bottom surfaces 194 on the locking ribs 186.

An alternative mechanism for detachably interlocking the lower fan enclosure member 136 and the intermediate housing member 150 is shown for lower fan enclosure member 136' and intermediate housing member of 150' in FIGS. 21 through 23 in which locking ribs 186 are omitted. The outside surface of the longitudinally extending annular portion 178' and the outside edge 184' of the laterally extending portion 182' on the one hand and the longitudinally extending edge 176' of each rib 172' and the inside surface of the lateral wall 152' immediately adjacent the base of the intermediate housing member 150' on the other hand are built to such dimensions that the lower fan enclosure member 136' and the intermediate housing member 150' are force fitted together and interlocked by the frictional interengagement of the outside surface of the longitudinally extending annular portion 178' with the edges 176' and the outside edge 184' with the inside surface of wall 152'.

Projecting from the second face 64 of the filter 58 on which they are integrally formed are a plurality of spacing members or projections 196 each extending generally perpendicularly with respect to the plane of the second face 64 and of the filter 58. The spacing members 196 are uniform in height and each has at the end thereof one or more shoulders 198 disposed perpendicularly with respect to the spacing members 196 and parallel to the plane of the filter 58. Some of the spacing members 196 also have prongs 200 at the ends thereof. Located in the first face 62 of the filter 58 are a plurality of sockets or recesses 202 similar in dimensions to the prongs 200.

Each of the filters 142, 144, 146 has thereon spacing members 204 and sockets 206 similar to the spacing members 196 and sockets 202 of the filter 58 of the device 10. By means of these elements the filters 142, 144, 146 are spaced with respect to one another with the filter 146 mounted on the filter 144 which is in turn mounted in the filter 142. Spacing member prongs 208 of one of the filters 144, 146 similar to the spacing member prongs 200 of filter 58 are inserted into the corresponding sockets 206 in the next lower filter thereby mounting each of the filters 144, 146 on the next lower filter with the shoulders 210 of the spacing members 204 abutting the upper face of each respective filter.

The spacing members 196 and sockets 202 of the filter 58 perform no function in the structure of device 10. Neither do the spacing members 204 of filter 142 nor the sockets 206 of filter 146. However, the structures of the devices 10 and 134 are such as to accommodate a uniform structure for the filter so that only one form of the filter need be produced regardless of the number of filters to be used in the device and their location relative to one another. Consequently, the number of filters in the air filtering device of this invention may be varied with the only modification to the structure of the device being the substitution of an intermediate housing member 150 of appropriate length. All the other unitary structural elements of the air filtering device remain the same.

The structures of the device 10 and the device 134 are such that access to their filters 58, 142, 144 and 146 is readily achieved. In device 10, the housing 114 is detached from the lower filter enclosure member 22 by disengaging the arm members 122, 124 from the openings 128 in the housing 114. This can be done by pushing the arm members 122, 124 inwardly through the spacings 128 in the housing 114. The filter 58 can then be removed from the recess 100 and shoulders 102 and replaced if desired. In device 134, the upper housing member 140 is disengaged from the intermediate housing member 150 by disengaging the arms 164 from openings 168 in a manner similar to that for the arm members 122, 124 of device 10. With the upper housing 140 removed, the intermediate housing member 150 can in turn be detached from the lower fan enclosure member 136 by bending the arm members 188 inwardly out of engagement with the latching ribs 186. Alternatively, where the intermediate housing member and the lower fan enclosure member are force fitted as with intermediate housing member 150' and lower fan enclosure member 136', they may be detached by applying sufficient longitudinal force to overcome the force fit. All or any number of the filters 142, 144, 146 may then be disconnected from one another and removed from the device 134 and replaced. The interconnections of the filters 142, 144, 146 among one another are by force or friction fit via the sockets 206 and spacing members 204 having prongs 208 thereon. The stack of filters 142, 144, 146 is retained in position on the upper fan enclosure member 138 by the upper housing member 140 and the intermediate housing member 150.

While the various flexible locking arms have been disclosed as being on one structural member and their respective locking openings or ribs on the structural member to which the first structural member is engaged, it is possible where the structure otherwise permits for the respective locking elements to be reversed with respect to which structural member they are located on. Also, while in most instances the flexible locking arms and corresponding openings or ribs have been two in number, any plural number of cooperating locking elements may be used where appropriate.

Each of the main structural elements of the device, i.e. the upper and lower fan enclosure members and the housing or, alternatively, the upper housing member and the intermediate housing member, is preferably a molded plastic unit.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. An air filtering device adapted to convey air longitudinally therethrough from inlet means at the top thereof to outlet means at the base thereof, said air filtering device comprising:
    (a) fan means generally at the base of said device for drawing air generally longitudinally through said device and expelling the air adjacent the base of said device through said outlet means;
    (b) a unitary lower fan enclosure member and a unitary upper fan enclosure member encasing said fan means, said lower fan enclosure member having said outlet means therein and including first mating means, said lower fan enclosure member having second mating means, said second mating means being located adjacent said first mating means and laterally spaced exteriorly of said first mating means;
    (c) said upper fan enclosure member having means for the passage of air therethrough and mating means for engaging said first mating means of said lower fan enclosure member for thereby encasing said fan means, said upper fan enclosure member and said lower fan enclosure member including means for locking together said upper and lower fan enclosure members;

(d) a filter for filtering air being conveyed through said device, said filter having a filter material enclosure containing filter material;

(e) filter positioning means in said upper fan enclosure member for receiving and positioning said filter above said upper fan enclosure member and outside said upper and lower fan enclosure members at an angle with respect to the longitudinal axis of said device and the general direction of air flow through said device;

(f) a housing for enclosing said filter and said upper fan enclosure member, said housing having mating means for engaging said second mating means of said lower fan enclosure member thereby enclosing said filter and said upper fan enclosure member, said housing and said lower fan enclosure member including means for locking said housing and said lower fan enclosure member together; and (g) said housing having said inlet means therein, said inlet means comprising a planar surface with port means therethrough, said planar surface being disposed in a plane at an angle with respect to the longitudinal axis of said device equal to said angle of said filter, said inlet means being immediately adjacent said filter, the periphery of said filter extending to the interior wall of said housing.

2. The air filtering device of claim 1 wherein said upper fan enclosure member and said housing each have generally cylindrical lateral walls, said lateral wall of said housing having a diameter greater than the diameter of said lateral wall of said upper fan enclosure member whereby said housing is adapted to fit generally concentrically over said upper fan enclosure member to enclose said upper fan enclosure member and said filter.

3. The air filtering device of claim 1 wherein said filter is generally disc-shaped having first and second parallel faces through which the air flow passes.

4. The air filtering device of claim 1 wherein said inlet means includes a series of louver boards disposed parallel to the longitudinal axis of said device.

5. The air filtering device of claim 1 wherein said filter material comprises a bed of activated charcoal and a layer of thermoplastic foam material adjacent said bed.

6. The air filtering device of claim 1 wherein said upper and lower fan enclosure members and said housing have lateral peripheral walls generally cylindrical in cross section and said filter is elliptical in shape.

7. The air filtering device of claim 6 wherein the planar surface of said inlet means of said housing has a generally elliptical shape corresponding to the shape of said filter.

8. The air filtering device of claim 1, wherein:
(a) said housing comprises a unitary upper housing member and a unitary intermediate housing member, said inlet means being located in said upper housing member and said mating means for engaging said second mating means of said lower fan enclosure member being located on said intermediate housing member; and
(b) said upper housing member and said intermediate housing member respectively having mating means for interengaging said upper housing member and said intermediate housing member and means for interlocking said upper housing member and said intermediate housing member together.

9. The air filtering device of claim 1 or 8 and including:
(a) a plurality of filters contained within said device and arranged generally one above the other, the lowermost of said filters being positioned in said positioning means of said upper fan enclosure member, the uppermost of said filters being immediately adjacent said inlet means of said housing, said plurality of filters being disposed parallel to one another, each thereby being disposed at an angle with respect to the longitudinal axis of said device and the general direction of air flow through said device, the periphery of each of said filters extending to the interior wall of said housing; and
(b) filter stacking means for positioning and spacing said plurality of filters with respect to one another.

10. The air filtering device of claim 9 wherein said inlet means includes a series of louver boards disposed parallel to the longitudinal axis of said device.

11. The air filtering device of claim 9 wherein said filter material comprises a bed of activated charcoal and a layer of thermoplastic foam material adjacent said bed.

12. The air filtering device of claim 9 wherein each of said plurality of filters includes a filter material enclosure containing a filter material.

13. The air filtering device of claim 12 wherein said filter stacking means comprises means integrally formed on each of said filter material enclosures for positioning and spacing each said filter from the next adjacent of said filters.

14. The air filtering device of claim 13 wherein said plurality of filters are identical in structure.

15. The air filtering device of claim 13 wherein said plurality of filters are equidistantly spaced from one another.

16. The air filtering device of claim 13 wherein each said filter is generally disc-shaped having first and second parallel faces through which the air flow passes.

17. The air filtering device of claim 16 wherein said filter stacking means of each said filter comprises:
(a) a plurality of projections on one of said first and second faces disposed generally perpendicularly with respect to said one of said first and second faces, some of said projections each having a prong on the end thereof spaced from said one of said first and second faces; and
(b) prong receiving recesses in the other of said first and second faces for insertion of the prongs of the next adjacent filter with the projections of the next adjacent filter in abutting contact with the surface of said other of said first and second faces.

18. The air filtering device of claim 16 wherein each said filter is an elliptically-shaped disc and said filter stacking means are adapted to orient said plurality of filters so that said filters are staggered with respect to one another with the peripheries of said filters extending to the interior wall of said housing thereby defining a cylinder in overall configuration.

19. The air filtering device of claim 1 wherein:
(a) said lower fan enclosure member has a generally cylindrical lateral wall; and
(b) said first mating means and said second mating means of said lower fan enclosure member each comprise an annular shoulder lying in a plane generally perpendicular to the longitudinal axis of said device, said first mating means and said second mating means of said lower fan enclosure member facing in the same longitudinal direction with said first mating means of said lower fan enclosure member being located on the inside of said lateral wall of said lower fan enclosure member and said second mating means of said lower fan enclosure member being located on the outside of said lateral wall of said lower fan enclosure member with a longitudinally extending annular portion of said lateral wall separating said first and second mating means.

20. The air filtering device of claim 19 wherein:
(a) said upper fan enclosure member has a generally cylindrical lateral wall; and
(b) said mating means of said upper fan enclosure member comprises an annular shoulder located on said lateral wall of said upper fan enclosure member lying in a plane generally perpendicular to the longitudinal axis of said device and opposed to said first mating means of said lower fan enclosure member.

21. The air filtering device of claim 20 wherein said means for locking together said upper and lower fan enclosure members comprises:
(a) a plurality of laterally extending openings in said lateral wall of one of said upper and lower fan enclosure members and a corresponding number of longitudinally extending locking members extending from the other of said upper and lower fan enclosure members, each said locking member having a lateral protrusion thereon adapted to engage one of said openings.

22. The air filtering device of claim 19 wherein:
(a) said housing has a generally cylindrical lateral wall; and,
(b) said mating means of said housing comprises an annular shoulder on said lateral wall of said housing lying in a plane generally perpendicular to the longitudinal axis of said device and opposed to said second mating means of said lower fan enclosure member.

23. The air filtering device of claim 22 wherein said means for locking together said housing and said lower fan enclosure member comprises:
(a) a plurality of laterally extending openings in one of said housing and said lower fan enclosure member and a corresponding number of longitudinally extending locking members extending from the other of said housing and said lower fan enclosure member, each said locking member having a lateral protrusion thereon adapted to engage one of said openings.

24. The air filtering device of claim 22 wherein said means for locking said housing and said lower fan enclosure member together comprises means for frictionally interengaging said housing and said lower fan enclosure member.

25. The air filtering device of claim 8 wherein:
(a) said lower fan enclosure member has a generally cylindrical lateral wall;
(b) said second mating means of said lower fan enclosure member comprises an annular shoulder lying in a plane generally perpendicular to the longitudinal axis of said device;
(c) said upper housing member and said intermediate housing member each have a generally cylindrical lateral wall;
(d) said mating means of said housing for engaging said second mating means of said lower fan enclosure member comprises shoulder means on said lateral wall of said intermediate housing member lying in a plane generally perpendicular to the longitudinal axis of said device and opposed to said second mating means of said lower fan enclosure member;
(e) said means for interengaging said upper housing member and said intermediate housing member comprises an annular shoulder on the wall of said upper housing member and an annular shoulder on the wall of said intermediate housing member opposed to said annular shoulder of said upper housing member, said annular shoulders of said upper housing member and said intermediate housing member each lying in a plane generally perpendicular to the longitudinal axis of said device, said annular shoulder on the wall of said upper housing member also being adapted to engage said second mating means of said lower fan enclosure member in the absence of said intermediate housing member.

26. The air filtering device of claim 25 wherein said means for interlocking said upper housing member and said intermediate housing member together comprises:
(a) a plurality of laterally extending openings in said upper housing member and a corresponding number of locking members longitudinally extending from said intermediate housing member, each said locking member of said intermediate housing member having a lateral protrusion thereon adapted to engage one of said openings.

27. The air filtering device of claim 26 wherein said means for locking said housing and said lower fan enclosure member together comprises:
(a) a plurality of locking shoulders lying in a plane generally perpendicular to the longitudinal axis of said device on the inside of said lateral wall of said intermediate housing member; and
(b) a corresponding number of locking members extending longitudinally from said lower fan enclosure member, each said locking member of said lower fan enclosure member having a lateral protrusion thereon adapted to engage one of said locking shoulders, said locking members on said lower fan enclosure member also being adapted to engage said laterally extending openings in said upper housing member in the absence of said intermediate housing member.

28. The air filtering device of claim 26 wherein said means for locking said housing and said lower fan enclosure member together comprises means on said intermediate housing member and said lower fan enclosure member for frictionally interengaging said intermediate housing member and said lower fan enclosure member.

29. The air filtering device of claim 25 wherein:
(a) said first mating means of said lower fan enclosure member comprises an annular shoulder lying in a plane generally perpendicular to the longitudinal axis of said device; and
(b) said first mating means of said lower fan enclosure member faces in the same longitudinal direction as said second mating means of said lower fan enclosure member with said first mating means of said lower fan enclosure member being located on the inside of said lateral wall of said lower fan enclosure member and said second mating means of said lower fan enclosure member being located on the outside of said lateral wall of said lower fan enclosure member with a longitudinally extending annular portion of said lateral wall separating said first and second mating means.

30. The air filtering device of claim 29 wherein:
(a) said upper fan enclosure member has a generally cylindrical lateral wall; and,
(b) said mating means of said upper fan enclosure member comprises an annular shoulder located on said lateral wall of said upper fan enclosure member lying in a plane generally perpendicular to the longitudinal axis of said device and opposed to said first mating means of said lower fan enclosure member.

31. The air filtering device of claim 30 wherein said means for locking together said upper and lower fan enclosure members comprises:
(a) a plurality of laterally extending openings in said lateral wall of one of said upper and lower fan enclosure members and a corresponding number of locking members extending longitudinally from the other of said upper and lower fan enclosure members, each said locking member having a lateral protrusion thereon adapted to engage one of said openings.

32. The air filtering device of claim 30 wherein said generally cylindrical lateral wall of said intermediate housing member has a diameter greater than the diameter of said lateral wall of said upper fan enclosure member whereby said intermediate housing member is adapted to fit generally concentrically over said upper fan enclosure member.

33. The air filtering device of claim 1 wherein said filter positioning means comprises a recess in said upper fan enclosure member for receiving a portion of said filter and a longitudinally extending shoulder means projecting from said upper fan enclosure member adjacent said recess for engaging said filter.

34. The air filtering device of claim 33 wherein said filter has at the lateral periphery thereof a tab and said recess of said upper fan enclosure member includes a slot for receiving said tab.

35. The air filtering device of claim 33 wherein said filter is elliptical in shape and said portion of said filter received by said recess of said upper fan enclosure member comprises a portion of said filter adjacent said periphery of said filter at one of the points where the major axis of the ellipse formed by said filter passes through said periphery.

36. The air filtering device of claim 35 wherein said filter has a tab at the lateral periphery thereof at said one of the points where the major axis of the ellipse formed by said filter passes through said periphery, and said upper fan enclosure member recess includes a slot for receiving said tab.

37. The air filtering device of claim 9 wherein said filter positioning means comprises a recess in said upper fan enclosure member for receiving a portion of the lowermost of said filters and a longitudinally extending shoulder means projecting from said upper fan enclosure member adjacent said recess for engaging the lowermost of said filters.

38. The air filtering device of claim 37 wherein the lowermost of said filters has at the lateral periphery thereof a tab and said recess of said upper fan enclosure member includes a slot for receiving said tab.

39. The air filtering device of claim 37 wherein the lowermost of said filters is elliptical in shape and the portion of said lowermost filter received by said recess of said upper fan enclosure member comprises a portion of said lowermost filter adjacent said periphery of said lowermost filter at one of the points where the major axis of the ellipse formed by said lowermost filter passes through said periphery.

40. The air filtering device of claim 39 wherein said lowermost filter has a tab at the lateral periphery thereof at said one of the points where the major axis of the ellipse formed by said lowermost filter passes through said periphery, and said upper fan enclosure member recess includes a slot for receiving said tab.

41. The air filtering device of claim 9 wherein said upper and lower fan enclosure members and said housing have lateral peripheral walls generally cylindrical in cross section and each of said plurality of filters is elliptical in shape.

42. The air filtering device of claim 41 wherein the planar surface of said inlet means of said housing has a generally elliptical shape corresponding to the shape of said plurality of filters.

* * * * *